US009542753B2

(12) United States Patent
Mai

(10) Patent No.: US 9,542,753 B2
(45) Date of Patent: Jan. 10, 2017

(54) 3D RECONSTRUCTION OF TRAJECTORY

(71) Applicant: CANON KABUSHIKI KAISHA, Tokyo (JP)

(72) Inventor: Fei Mai, Parramatta (AU)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 13/714,327

(22) Filed: Dec. 13, 2012

(65) Prior Publication Data

US 2013/0163815 A1 Jun. 27, 2013

(30) Foreign Application Priority Data

Dec. 21, 2011 (AU) ................................ 2011265430

(51) Int. Cl.
*G06T 7/20* (2006.01)

(52) U.S. Cl.
CPC ............. *G06T 7/20* (2013.01); *G06T 7/2033* (2013.01); *G06T 2207/10016* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| 5,602,760 | A   | * | 2/1997  | Chacon et al.    | 382/103 |
|-----------|-----|---|---------|------------------|---------|
| 8,098,888 | B1  | * | 1/2012  | Mummareddy et al.| 382/103 |
| 2004/0239509 | A1 |   | 12/2004 | Kisacanin et al. |         |
| 2009/0052739 | A1 |   | 2/2009  | Takahashi et al. |         |
| 2009/0268033 | A1 | * | 10/2009 | Ukita            | 348/169 |
| 2009/0296985 | A1 | * | 12/2009 | Lv et al.        | 382/103 |
| 2011/0091073 | A1 | * | 4/2011  | Iwasaki et al.   | 382/103 |
| 2011/0091074 | A1 | * | 4/2011  | Nobori et al.    | 382/103 |
| 2011/0255747 | A1 | * | 10/2011 | Iwasaki et al.   | 382/103 |
| 2011/0255748 | A1 | * | 10/2011 | Komoto et al.    | 382/103 |
| 2012/0206597 | A1 | * | 8/2012  | Komoto et al.    | 348/135 |
| 2012/0219184 | A1 | * | 8/2012  | Maki et al.      | 382/103 |

OTHER PUBLICATIONS

Park, Hyun Soo, et al. "3D Reconstruction of a Moving Point from a Series of 2D Projections." Computer Vision—ECCV 2010. Springer Berlin Heidelberg, 2010. 158-171.*
Rosales, Romer, and Stan Sclaroff. Improved tracking of multiple humans with trajectory prediction and occlusion modeling. Boston University Computer Science Department, 1998.*

(Continued)

*Primary Examiner* — Jayesh A Patel
*Assistant Examiner* — Geoffrey E Summers
(74) *Attorney, Agent, or Firm* — Canon U.S.A., Inc. IP Division

(57) ABSTRACT

Disclosed is a method of determining a 3D trajectory of an object from at least two observed trajectories of the object in a scene. The observed trajectories are captured in a series of images by at least one camera, each of the images in the series being associated with a pose of the camera. First and second points of the object from separate parallel planes of the scene are selected. A first set of 2D capture locations corresponding to the first point and a second set of 2D capture locations corresponding to the second point are reconstructed to determine an approximated 3D trajectory of the object.

12 Claims, 12 Drawing Sheets

(56) References Cited

OTHER PUBLICATIONS

Khan, Saad M., and Mubarak Shah. "Tracking multiple occluding people by localizing on multiple scene planes." Pattern Analysis and Machine Intelligence, IEEE Transactions on 31.3 (2009): 505-519.*
Black, James, Ellis, Tim, and Rosin, Paul. "Multi View Image Surveillance and Tracking." Workshop on Motion and Video Computing 2002 (Motion 2002). Dec. 5-6, 2002, Orlando, FL. Los Alamitos, CA: IEEE, 2002. 169-174.
Avidan, Shai & Amnon Shashua. "Trajectory Triangulation: 3D Reconstruction of Moving Points from a Monocular Image Sequence," IEEE Transactions on Pattern Analysis and Machine Intelligence. 22.4 (2000): 348-357.
Pflugfelder, Roman & Horst Bischof. "Localization and Trajectory Reconstruction in Surveillance Cameras with Nonoverlapping Views," IEEE Transactions on Pattern Analysis and Machine Intelligence. 32.4 (2010): 709-721.
Park, Hyun Soo & Takaaki Shiratori, Iain Matthews, Yaser Sheikh. "3D Reconstruction of a Moving Point from a Series of 2D Projections." EECV'10 Proceedings of the 11th European Conference on Computer Vision: Part III. Sep. 5-11, 2010, Crete, Greece. Daniilidis, Kostas & Petros Maragos, Nikos Paragios, Eds. Heidelberg: Springer-Verlag Berlin, 2010.

* cited by examiner

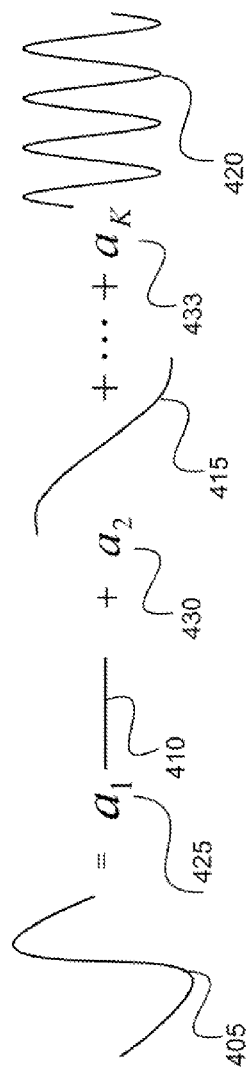
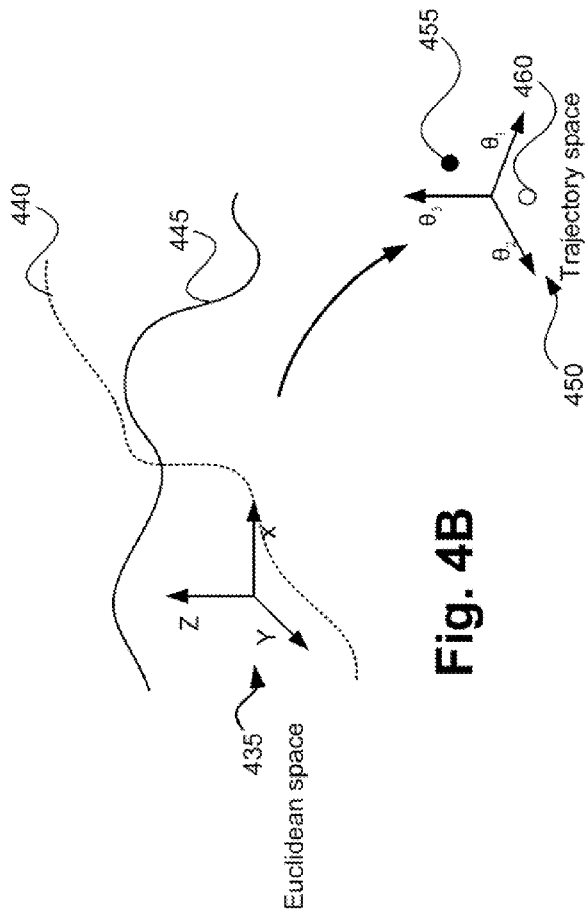
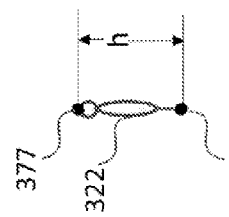
Fig. 4A
Fig. 4B
Fig. 3B

3D RECONSTRUCTION OF TRAJECTORY

REFERENCE TO RELATED PATENT APPLICATION

This application claims the benefit under 35 USC. §119 of the filing date of Australian Patent Application No. 2011265430, filed Dec. 21, 2011, hereby incorporated by reference in its entirety as if fully set forth herein.

TECHNICAL FIELD

The present disclosure relates generally to video processing and, in particular, to the three-dimensional (3D) trajectory reconstruction for a multi-camera video surveillance system.

BACKGROUND

Video cameras, such as Pan-Tilt-Zoom (PTZ) cameras, are omnipresent nowadays and commonly used for surveillance purposes. Such cameras capture more data (video content) than human viewers can process. Hence, a need exists for automatic analysis of video content. The field of video analytics addresses this need for automatic analysis of video content. Video analytics is typically implemented in hardware or software. The functional component may be located, on the camera itself, a computer, or a video recording unit connected to the camera. When multiple cameras are used to monitor a large site, a desirable technique in video analytics is to estimate the three-dimensional (3D) trajectories of moving objects in the scene from the video captured by the video cameras and model the activities of the moving objects in the scene.

The term 3D trajectory reconstruction refers to the process of reconstructing the 3D trajectory of an object from a video that comprises two-dimensional (2D) images. Hereinafter, the terms 'frame' and 'image' are used interchangeably to describe a single image taken at a specific time step in an image sequence. An image is made up of visual elements, for example pixels, or 8×8 DCT (Discrete Cosine Transform) blocks as used in PEG images. Three-dimensional 3D trajectory reconstruction is an important step in a multi-camera object tracking system, enabling high-level interpretation of the object behaviours and events in the scene.

One approach to 3D trajectory reconstruction requires overlapping views across cameras. That is, the cameras must have fields of view that overlap in the system. The 3D positions of the object at each time step in the overlapping, coverage are estimated by triangulation. The term 'triangulation' refers to the process of determining a point in 3D space given the point's projections onto two or more images. When the object is outside the overlapping coverage zone but remains within one of the fields of view, the object tracking system continues to track the object based on the last known position and velocity in the overlapping coverage zone. Disadvantageously, this triangulation technique depends on epipolar constraints for overlapping fields of view and hence cannot be applied to large scale surveillance systems, where cameras are usually installed in a sparse network with non-overlapping fields of view. That is, the fields of views do not overlap in such large scale surveillance systems.

Another approach to reconstructing the 3D trajectory of a moving object is to place constraints on the shape of the trajectory of the moving object. In one example, the object is assumed to move along a line or a conic section. A monocular camera moves to capture the moving object, and the motion of the camera is generally known. However, the majority of moving objects, such as walking persons, in practical applications frequently violate the assumption of known trajectory shape.

In another approach for constructing a trajectory from overlapping images, the 3D trajectory of a moving object can be represented as a compact linear combination of trajectory bases. That is, each trajectory in a 3D Euclidean space can be mapped to a point in a trajectory space spanned by the trajectory bases. The stability of the reconstruction depends on the motion of the camera. A good reconstruction is achieved when the camera motion is fast and random, as well as having overlapping fields of view. A poor reconstruction is obtained when the camera moves slowly and smoothly. Disadvantageously, this method is difficult to apply in real-world surveillance systems, because cameras are usually mounted on the wall or on a pole, without any motion.

In yet another approach, a smoothness constraint can be imposed requiring the error between two successive velocities should be generally close to zero. This method can recover the camera centres and the 3D trajectories of the objects. However, the reconstruction error of the points is orders of magnitude larger than the camera localization error, so that the assumption of motion smoothness is too weak for an accurate trajectory reconstruction.

Thus, a need exists for an improved method for 3D trajectory reconstruction in video surveillance system.

SUMMARY

According to an aspect of the present disclosure, there is provided a method of determining a 3D trajectory of an object from at least two observed trajectories of the object in a scene. The observed trajectories are captured in a series of images by at least one camera, each of the images in the series being associated with a pose of the camera. The method selects first and second points of the object from separate parallel planes of the scene, and determines, from the series of captured images, a first set of 2D capture locations corresponding to the first point and a second set of 2D capture locations corresponding to the second point. The method reconstructs, relative to the pose of the camera, the first and second sets of 2D capture locations in the scene to determine a first approximated 3D trajectory from the first set of 2D capture locations in the scene and a second approximated 3D trajectory from the second set of 2D capture locations in the scene. The 3D trajectory of the object is then determined based on the first and second approximated 3D trajectories.

Other aspects are also disclosed.

BRIEF DESCRIPTION OF THE DRAWINGS

At least one embodiment of the invention are described, hereinafter with reference to the following drawings, in which:

FIGS. 3A and 3B are a schematic representation illustrating the geometric relationship between the observed 2D trajectory and the reconstructed 3D trajectory;

FIGS. 4A and 4B are plots illustrating the representation of a 3D trajectory using trajectory bases;

DETAILED DESCRIPTION

Figure 1A:
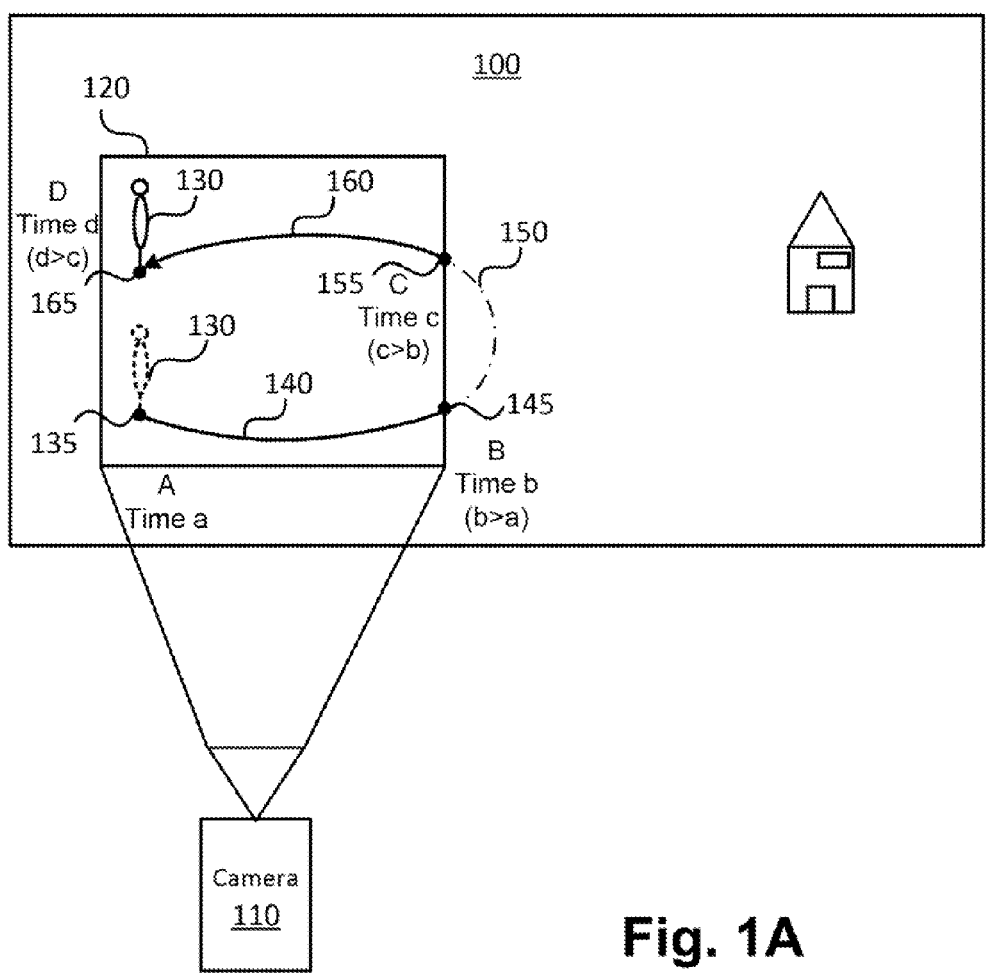
FIG. 1A is a block diagram demonstrating an example of the problem to be solved showing a person walking through the field of view (FOV) of a camera, resulting in two sections of observed trajectory and one section of unobserved trajectory.

Methods, apparatuses, and computer program products are disclosed for determining an unobserved trajectory of an object from at least two observed trajectories of the object in a scene. Also disclosed are methods, apparatuses, and computer program products for determining a trajectory of an object from at least two observed partial trajectories in a plurality of non-overlapping images of scenes captured by at least one camera. In the following description, numerous specific details, including camera configurations, scenes, selected points, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

1. Multi-Camera System

Figure 7:
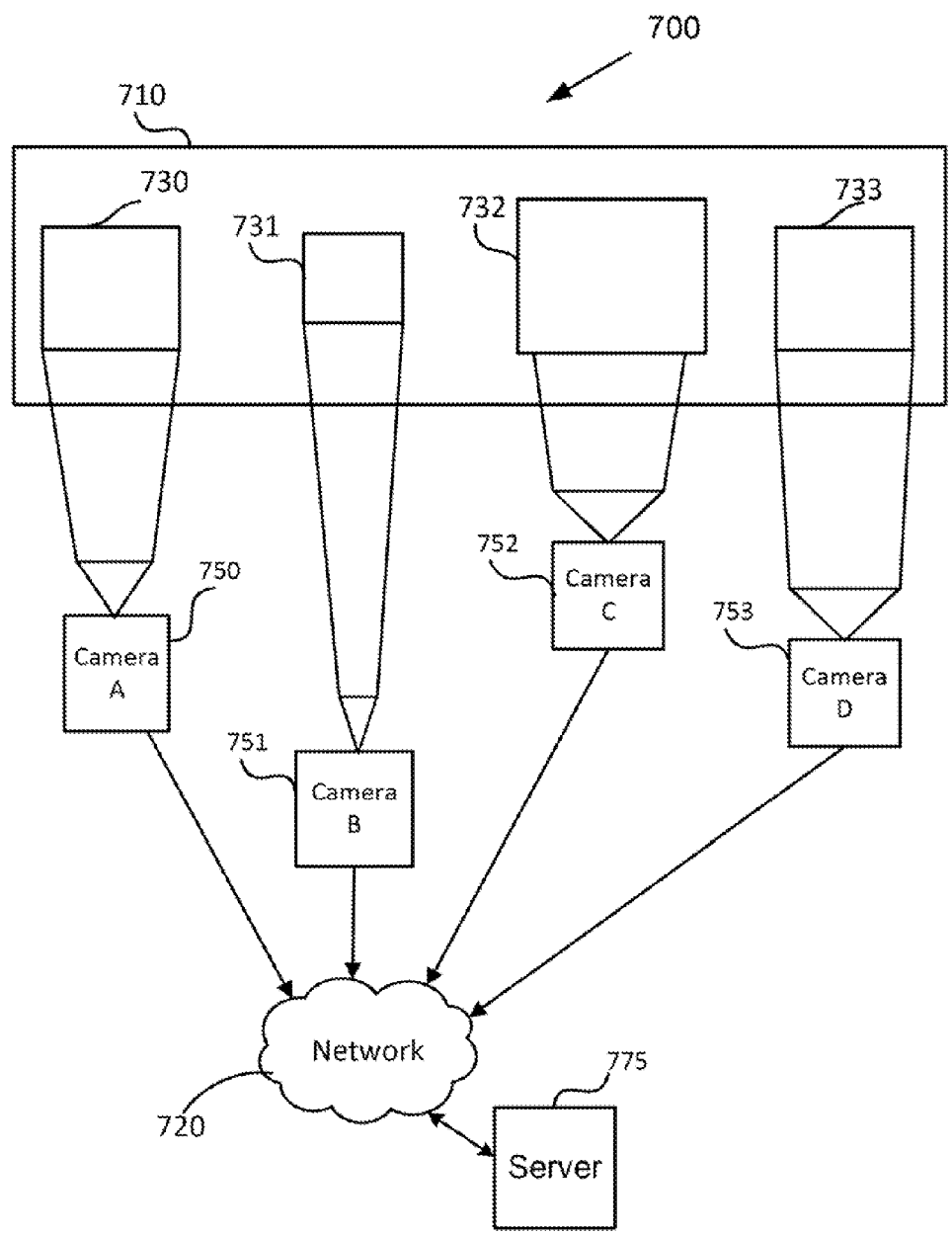
FIG. 7 is a block diagram illustrating a multi-camera system upon which embodiments of the present disclosure may be practised.

FIG. 7 is a schematic representation of a multi-camera system 700 on which embodiments of the present disclosure may be practised. The multi-camera system 700 is associated or oriented towards a scene 710, which is the complete scene that is being monitored or placed under surveillance. In the example of FIG. 7, the multi-camera system 700 includes four cameras with disjoint fields of view: camera A 750, camera B 751, camera C 752, and camera D 753. In one example, the scene 710 is a car park, and the four cameras 750, 751, 752, and 753 form a surveillance system used to monitor different areas of the car park. In one arrangement, the disjoint fields of view of the four cameras 750, 751, 752, and 753 correspond to points of entry and egress. This is useful when the multi-camera system 700 is used to monitor people entering and leaving an area under surveillance.

Each of cameras A 750, B 751, C 752, and D 753 is coupled to a server 775 via a network 720. The network 720 may be implemented using one or more wired or wireless connections and may include a dedicated communications link, a Local Area Network (LAN), a Wide Area Network (WAN), the Internet, or any combination thereof. In an alternative implementation, not illustrated, cameras A 750, B 751, C 752, and D 753 are coupled to the server 775 using direct communications links.

Camera A 750 has a first field of view looking at a first portion 730 of the scene 710 using PTZ coordinates $PTZ_{A-730}$. $PTZ_{A-730}$ represents the PTZ coordinates of camera A 750 looking at the first portion 730 of the scene 710, e.g. pan is 10 degrees, tilt is 0 degrees and zoom is 2. Camera B 751 has a second field of view looking at a second portion 731 of the scene 710 using PTZ coordinates $PTZ_{B-731}$ (e.g. pan is 5 degrees, tilt is 10 degrees and zoom is 0). Camera C 752 has a third field of view looking at a third portion 732 of the scene 710 using PTZ coordinates $PTZ_{C-732}$, and camera D 754 has a fourth field of view looking at a fourth portion 733 of the scene 710 using PTZ coordinates $PTZ_{D-733}$.

As indicated in FIG. 7, the cameras 750, 751, 752, and 753 in the multi-camera system 700 have disjoint fields of view, and thus the first portion 730, the second portion 731, the third portion 732, and the fourth portion 733 of the scene 710 have no overlapping sub-portions. In the example of FIG. 7, each of cameras A 750, B 751, C 752, and D 753 has a different focal length and is located at a different distance from the scene 710. In other embodiments, two or more of cameras A 750, B 751, C 752, and D 753 are implemented using the same camera types with the same focal lengths and located at the same or different distances from the scene 710.

2. Network Camera

Figure 6:
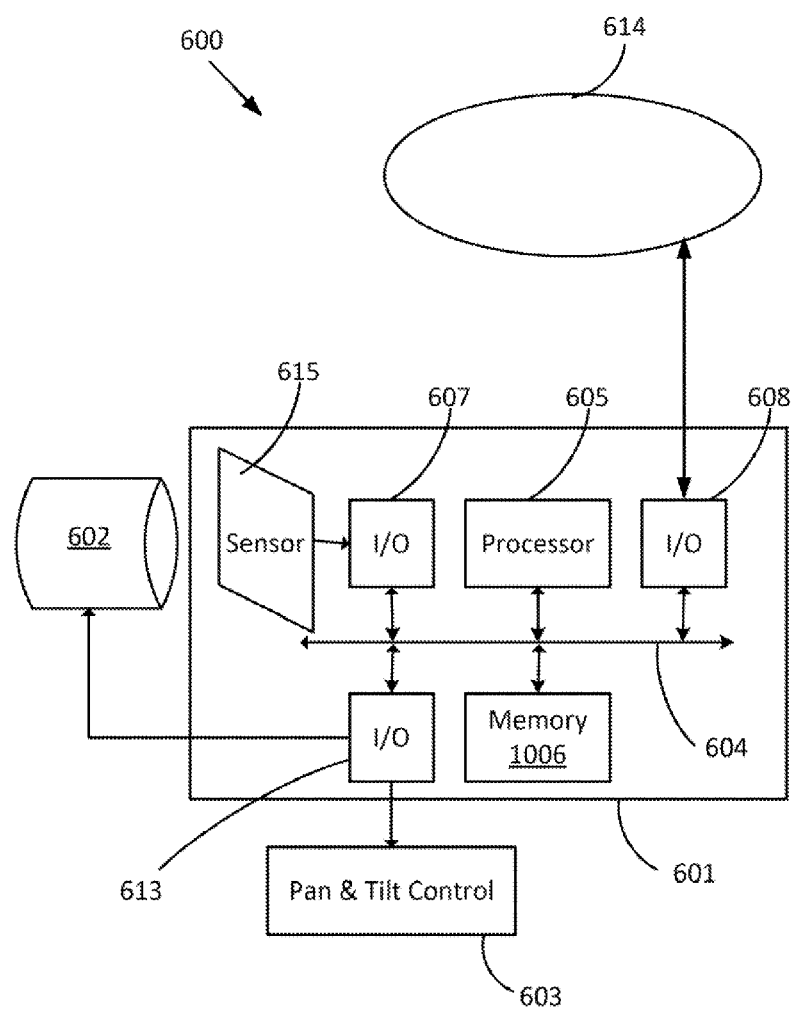
FIG. 6 is a schematic block diagram depicting a network camera, with which 3D trajectory reconstruction may be performed.

FIG. 6 shows a functional block diagram of a network camera 600, upon which three-dimensional (3D) trajectory reconstruction may be performed. The camera 600 is a pan-tilt-zoom camera (PTZ) comprising a camera module 601, a pan and tilt module 603, and a lens system 602. The camera module 601 typically includes at least one processor unit 605, a memory unit 606, a photo-sensitive sensor array 615, an input/output (I/O) interface 607 that couples to the sensor array 615, an input/output (I/O) interface 608 that couples to a communications network 614, and an interface 613 for the pan and tilt module 603 and the lens system 602. The components 607, 605, 608, 613, 606 of the camera module 601 typically communicate via an interconnected bus 604 and in a manner which results in a conventional mode of operation known to those skilled in the relevant art. Each of the four cameras 750, 751, 752, and 753 in the multi-camera system 700 of FIG. 7 may be implemented using an instance of the network camera 600.

3. Camera Network Example

FIG. 1A depicts an example setup where a camera 110, which may be one of the cameras in a camera network system, performs video surveillance on the field of view (FOV) 120 in a scene 100.

Initially at time a, a person 130 (depicted with dotted lines) starts walking at position A 135. The person 130 walks along a path 140 (depicted as a slightly curved arc) and arrives at position B 145 at a later time b (b>a). The person 130 leaves the FOV 120 and walks to a position C 155 at a still later time c (c>b), along a path 150 (depicted more acutely curved arc drawn with a dash-dot line). At position C 155, the person 130 re-enters the FOV 120 and walks to a position D 165 along a path 160 (again, a slightly curved arc) at some point later in time d.

The camera 110 captures the first observed trajectory 140 in the field of view 120. The trajectory 160 is the second observed trajectory captured by the camera 110 in the field of view 120. The trajectory 150 outside field of view (FOV) 120 is the unobserved trajectory which is not captured by the camera 110. The person 130 is depicted with solid lines at position D 165.

Figure 1B:
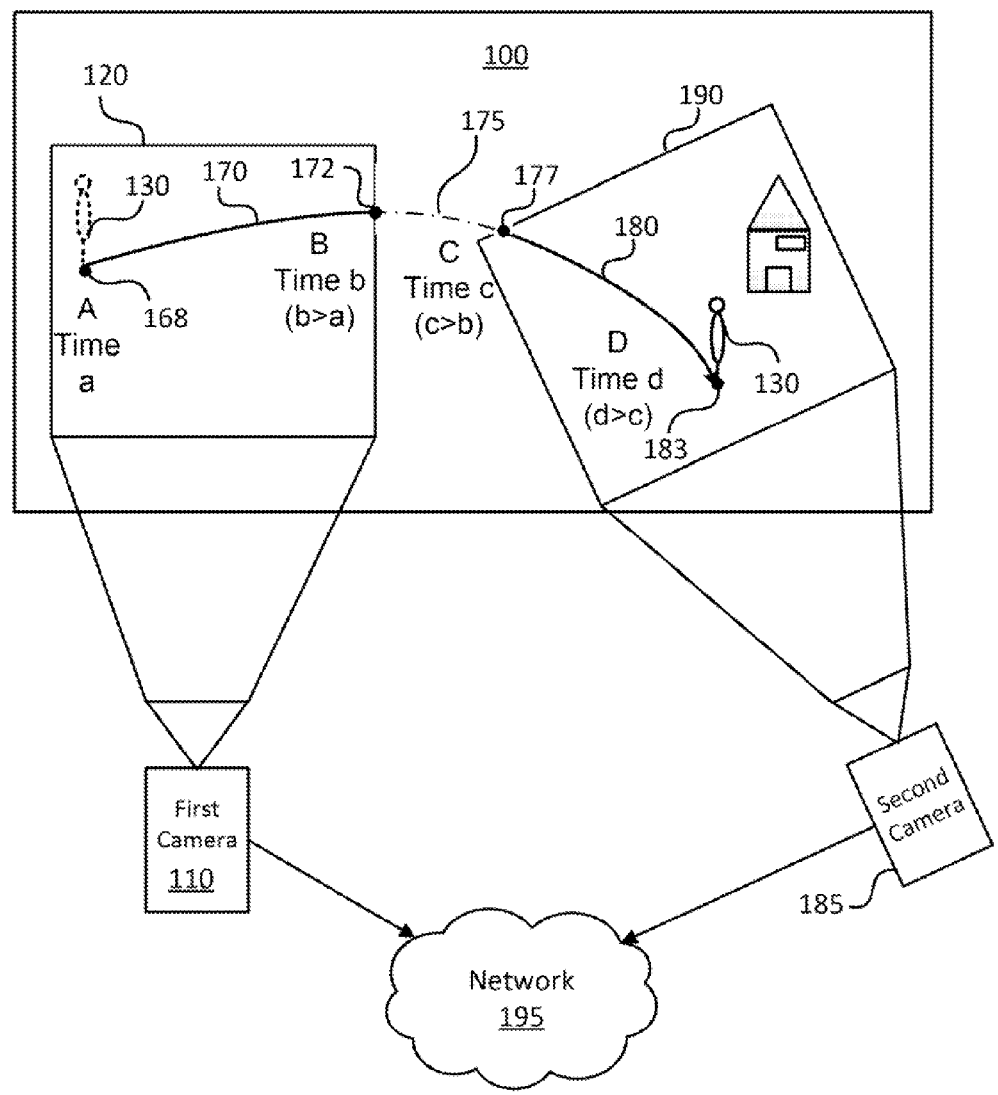
FIG. 1B is a block diagram demonstrating another example of the problem solved, showing a person walking through the fields of view (FOV) of two cameras, resulting in two sections of observed trajectory and one section of unobserved trajectory.

FIG. 1B illustrates another example setup where network cameras 110, 185 perform video surveillance on the scene 100. A first camera 110 and a second camera 185 are two network cameras in the network 195. The first camera 110 and the second camera 185 are coupled to the network 195 and perform video surveillance on the field of views 120 and 190, respectively. The field of views 120 and 190 are non-overlapping field of views in the scene 100. Also, the FONT 190 is oriented differently relatively to the FOV 120.

Initially, at time a, the person 130 (depicted with dashed lines) starts to walk at position A 168. The person 130 walks along a path 170 and arrives at position B 172 at a later time b. The person 130 leaves the field, of view (FOV) 120 of the first camera 110 and walks to a position C 177 at a still later time c, along a path 175 (dashed-dotted line). At position C 177, the person 130 enters the FOV 190 of the second camera 185 and walks to a position 1) 183 along a path 180 at some point in time d.

The first camera 110 captures the first observed trajectory 170 in the field of view 120. The trajectory 180 is the second observed trajectory captured by the second camera 185. The trajectory 175 outside both fields of view 120 and 190 is the unobserved trajectory, which is not captured by either camera 110 or camera 185.

Figure 1C:
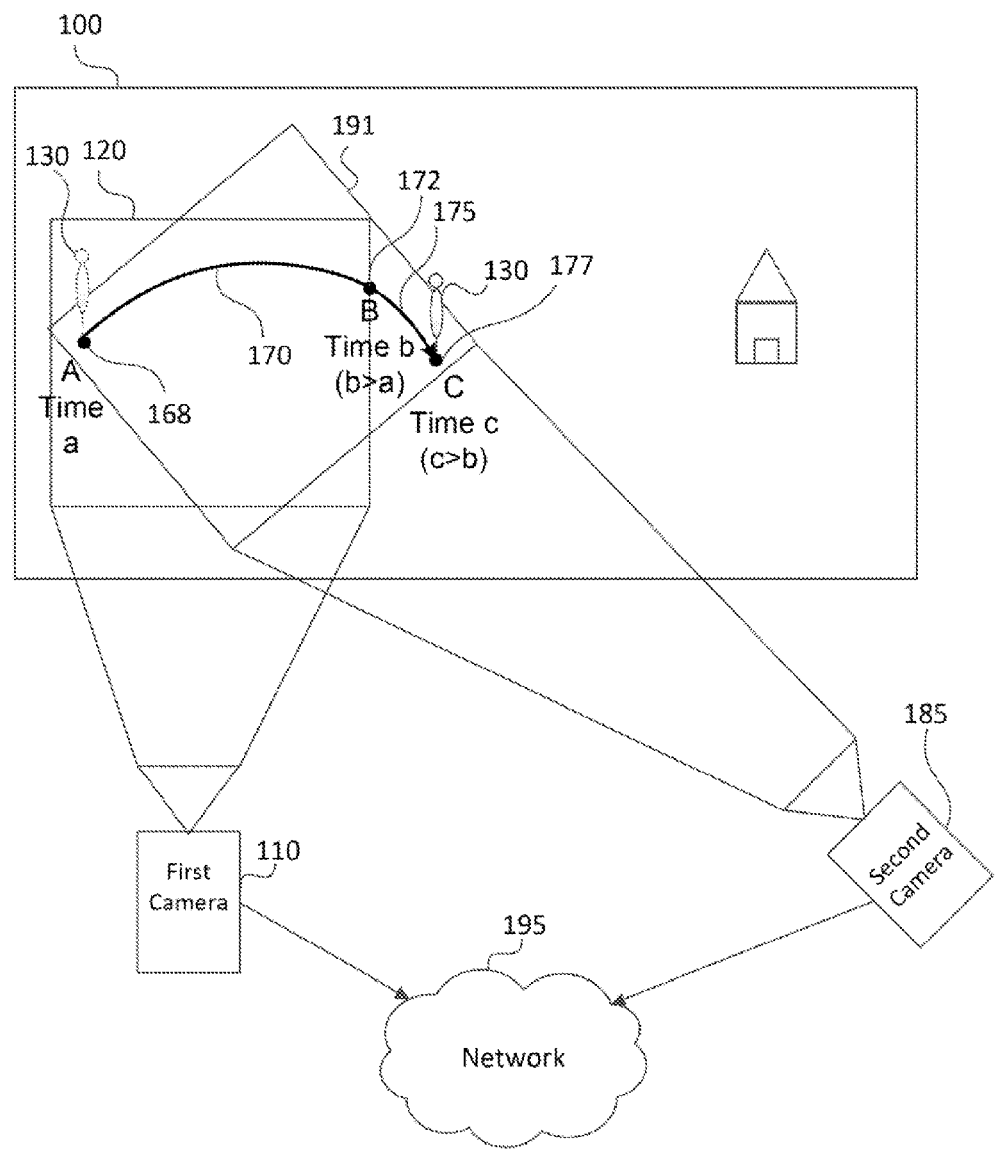
FIG. 1C is a block diagram demonstrating another example of the problem solved, showing a person walking through the fields of view (FOV) of two cameras, resulting in two sections of observed trajectory.

FIG. 1C illustrates another example setup where network cameras are performing video surveillance on the scene 100. A first camera 110 and a second camera 185 are two network cameras in the network 195. The first camera 110 and the second camera 185 are doing video surveillance on a portion of the scene 100 covered by respective fields of view 120 and 191. The fields of view 120 and 190 overlap in the scene 100. The extent of overlap will e seen to be substantial, but is not complete.

Initially at time a, the person 130 starts to walk from position A 168. The person 130 walks along a path 170 and arrives at position B 172 at a later time b. The person 130 walks to a position C 177 at a still later time c, along a path 175. The path 175 is in the FOV of the second camera 185.

The first camera 110 and the second camera 185 both capture the observed trajectory 170. In the arrangement illustrated, the trajectory 175 is observed by the second camera 185 only, being outside the field of view 120 of the first camera 110. In another arrangement, where the fields of view of the cameras 110 and 185 are essentially identical, the trajectory 175 is observed by both the first camera 110 and the second camera 185.

4. Method of 3D Trajectory Reconstruction

FIG. 2 illustrates a method 200 of performing a 3D trajectory reconstruction. The method 200 is designed to handle the scenarios depicted in FIGS. 1A and 1B, where part of the trajectory is unobserved by the camera network. The method 200 is also configured to handle the scenario discussed above in relation to FIG. IC, where the FOV of cameras overlap and thus the whole trajectory is observed. For the sake of clarity, the method 200 depicted in FIG. 2 reconstructs 3D trajectories from two observed two-dimensional (2D) trajectories only. However, in the light of this disclosure, a person skilled in the art will appreciate that this method 200 is readily scalable for 3D trajectory reconstruction from three or more observed 2D trajectories, which may arise in a multi-camera surveillance system having two, three, or more cameras with disjoint fields of view, as described above with reference to FIG. 7.

The proposed multi-view alignment imposes the following assumptions to the scene and the multi-camera object tracking system:

1) A common ground plane between multiple FOVs exists. In one arrangement, the FOVs overlap with each other. In another arrangement, the FOVs are disjoint across the camera network.

2) Each camera 750, 751, 752, 753 in the camera network 700 is synchronized with the other cameras 750, 751, 752, 753 over the network 720. For example, a first camera captures the scene or a portion of the scene from time point t=1 s to t=10 s, and a second camera captures the scene or a portion of the scene from time point t=15 s to t=30 s. The network 700 should synchronize the two cameras such that the time information stored in the video captured by the first camera is from time point t=1 s to t=10 s, and the time information stored in the video captured by the second camera is from time point t=15 s to t=30 s. In another example, a first camera captures the scene from time point t=1 s to t=10 s, and a second camera captures the scene from the time point t=1 s to t=10 s. The network should synchronize the two cameras such that at a certain time t, the two cameras capture the same scene in 3D at the same time t. One method synchronize cameras is to use a hardware trigger, and another method is to use a clap sound to manually synchronize the cameras. In one arrangement, the cameras move when performing the surveillance, such as PTZ cameras do: panning, tilting and zooming. In another arrangement, the cameras are static when performing the surveillance. For example, each camera may be installed at a fixed location and with a fixed angle.

3) The object has salient points that have a reasonable spatial consistency over time, and the salient points move parallel to the ground plane. In an example in which an object is a person, the method assumes that the person is in a consistent pose, such as an upright pose, with both head and feet positions visible in the images of each camera for the majority of the time. Two salient points are selected as the top point of the head and bottom point of the feet. In another example in which the object is a car, the method assumes that the car is in a consistent appearance, with the car roof and the car tyre positions visible in the images of each camera for the majority of the time. Two salient points are selected as the top point of the roof and bottom point of the tyre.

The 3D trajectory reconstruction method 200 depicted in FIG. 2 includes three sub-sequential processes 205, 232, and 258:

1) Selecting (205) a point pair from the object, and the point pair is consistent in each field of view;

2) Determining (232) the 2D locations of the point pair from the sequences of images captured by cameras in the camera network; and 3) Reconstructing (258) the 3D trajectory of the object represented by the 3D locations of the point pair.

The 3D trajectory reconstruction method begins at a Start step 202. Processing continues at a point pair selection step 205, to select a pair of points on the object, and step 235 to calibrate the network of cameras. The point pair selection step 205 selects, on the object, a pair of salient points that have a reasonable spatial consistency over time, and therefore the salient points move on separate parallel planes. For example, an object may be a person walking with an upright pose on a horizontal flat ground floor. In one arrangement the two salient points selected are: the top point of the head and the bottom point of the feet. The two salient points move on two separate horizontal planes. In another arrangement, the two salient points selected: the centre of the person's nose and the centre of the person's waist. In yet another example in which the object is a car, in one arrangement, the two salient points selected are: the top point of the roof and bottom point of the tyre of the car. In another arrangement, the two salient points selected are, for example, the centre of the back window and the centre of the license plate of the car.

Camera calibration step 235 calibrates the network of cameras. This may be done in parallel to steps 205 and 232. The camera calibration information includes, but is not limited to, internal parameters such as the focal length, and the external parameters such as the camera pose. i.e. camera location and orientation in a world coordinate system. The calibration information is obtained using camera network calibration techniques, and the world coordinate system is defined in the calibration techniques. One standard approach of camera network calibration is to use a planar pattern observed by the cameras with different poses, when the fields of view overlap across the cameras. Another approach is to use a mirror and a planar pattern to calibrate non-overlapping cameras. The mirror based approach first uses standard calibration methods to find the internal and external parameters of a set of mirrored cameras and then estimates the external parameters of the real cameras from their mirrored images.

Figure 2A:
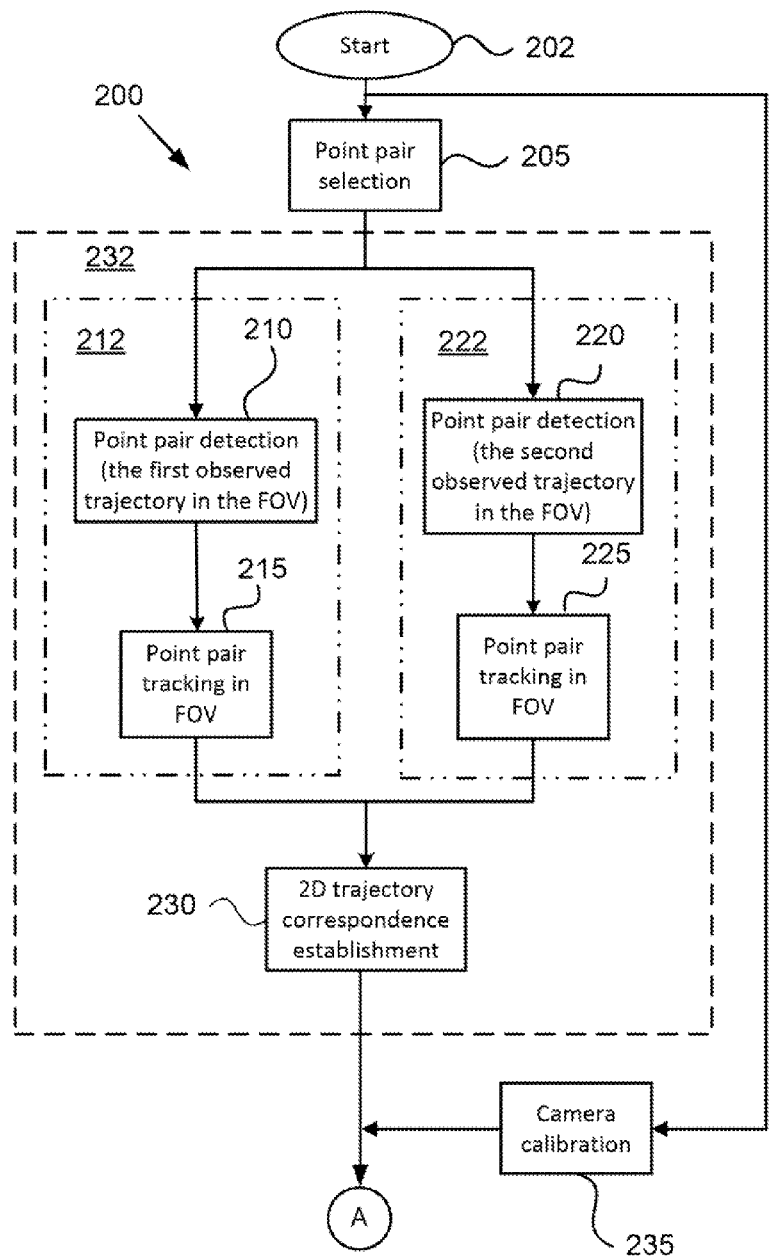
FIGS. 2A and 2B are a flow diagram illustrating a method of 3D trajectory reconstruction in accordance with the present disclosure.

Control then passes from step 205 to a point-pair 2D location determination process 232 (indicated by a dashed line box). In the example of FIG. 2A, there are two observed trajectories, either in the FOV of one camera, or in the FOV of two cameras in the camera network. The point pair 2D location determination process 232 in this example firstly runs processes 212 and 222 (indicated by dashed-dotted line boxes) in parallel based on each observed trajectory, for point pair detection and tracking in each FOV. The outputs from processes 212 and 222 are input to a step 230 to establish (determine) 2D trajectory correspondence. That is the processor 805 determines the trajectories observed by one or two cameras in this example corresponding to the same object either occurring simultaneously or some time later at its time of reappearance. In one arrangement, the first observed trajectory is observed by the first camera only and the second observed trajectory is observed by the second camera only. In another arrangement, the first observed trajectory is observed by both the first camera and the second camera. The second observed trajectory is observed by both the first camera and the second camera.

For the first observed trajectory in the FONT, processing continues from step 205 to a step 210, in which the selected point pair from step 205 is detected in image sequence captured by camera 1. In one arrangement, the selected point pair in step 205 is captured by camera 1 only. In another arrangement, the selected point pair in step 205 is captured by both camera 1 and camera 2. One of the methods for detecting the point pair in step 210 is through the object positional information in the FOV of camera 1 that is input to the 3D trajectory reconstruction method 200. In one embodiment, such object positional information is generated by performing foreground separation using a background modelling method such as Mixture of Gaussian (MoG) on the processor 605 of FIG. 6. The background model is maintained over time and stored in the memory 606. In another embodiment, a foreground separation method performed on Discrete Cosine Transform blocks generates object positional information.

From step 210 in FIG. 2A, processing continues at the next step 215, which tracks the moving point pair in the HIV of camera 1 and obtains first and second sets of 2D capture locations in the images. The 2D captured locations for a salient point are a series of locations on multiple images in a video sequence, where the salient point is observed. One of the methods for tracking the moving point pair is equivalent to tracking the object, since the point pair is detected through the object positional information, such as the top point and bottom point of the detected object. One embodiment generates the positional information associated with each moving object by performing foreground separation followed with a single camera tracking based on Kalman filtering on the processor 605 of FIG. 6. Another embodiment uses an Alpha-Beta filter for object tracking. In a further embodiment, the filter uses visual information about the object in addition to positional and velocity information.

The process 222 of point pair detection 220 and tracking 225 for the second observed trajectory in the FOV of camera 2 runs in parallel to the process 212 of point pair detection 210 and tracking 215 for the first observed trajectory in the FOV of camera 1. The process 222 on the second trajectory is identical to the process 212 on the first trajectory. In one example, cameras 1 and 2 are the same camera. In another example, cameras 1 and 2 are different cameras in a camera network 700. In one arrangement, the second observed trajectory is captured by camera 2 only. In another arrangement, the second observed trajectory is captured by both camera 1 and camera 2. The selected point pair selected in step 205 is passed to the point pair detection step 220 to detect the selected point pair in an image sequence captured by camera 2. Control passes from step 220 to the point pair tracking step 225 to track the moving point pair in the FOV of camera 2. The processor 805, in process 232, obtains first and second sets of 2D captured locations.

After running processes 212 and 222 in parallel in the exemplary arrangement, the two sets of point pair sequences output by the point tracking steps 215 and 225 for the first and second observed trajectories, respectively, are input to a 2D trajectory correspondence establishment step 230.

The 2D trajectory correspondence establishment step 230 in the process 232 determines the trajectories corresponding to the same object being either: simultaneously in different FOVs, or at different times in different FOVs or the same FOV (i.e., after being in a FOV, the object reappears some time later). In the case that the object occurs simultaneously in different FOVs, one method represents the object by object signatures and compares the object signature from different FOVs by computing a similarity measure. Epipolar constraints are applied to remove outliers. For the case that the object reappears in the same or a different FOV, in one embodiment, a training set of trajectories is used to learn the probability density function of transit times between FOV entries and exits. An appearance model (e.g. colour histograms of the object) may be used to learn the typical colour changes between FOVs. In another embodiment, each image is divided into a grid of windows, and a Hidden Markov model (HMM)-inspired approach may be applied to determine the probabilities of state transitions between windows.

Figure 2B:
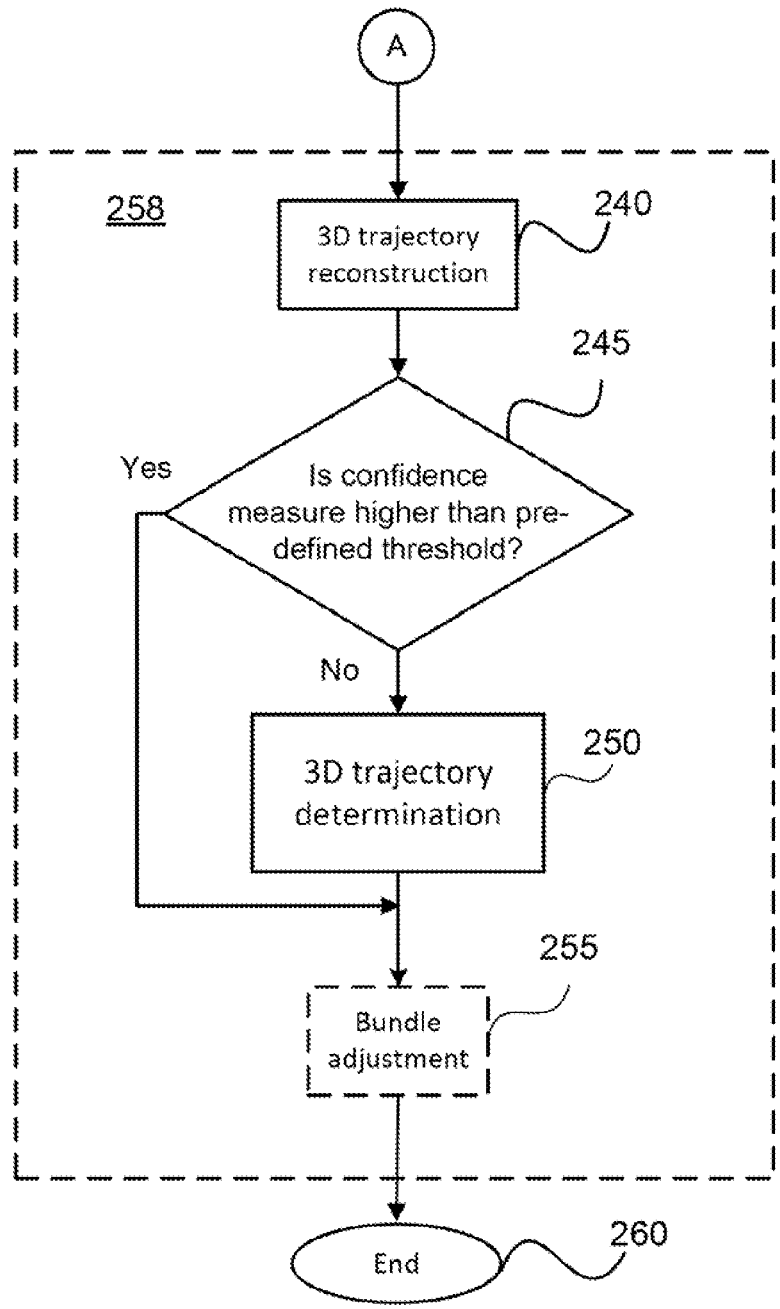

Referring to FIG. 2B, the 2D trajectory correspondences determined in the 2D trajectory correspondence establishment step 230, as well as the output of the camera calibration step 235, is passed to step 240 to perform 3D trajectory reconstruction 258 and compute the first approximated 3D trajectory from the first set of 2D captured locations in the scene and a second approximated 3D trajectory from the second set of 2D captured locations in the scene. The 3D trajectory represents the 3D locational information of the moving object when the object is moving along the observed trajectory and the unobserved trajectory. Details of the 3D trajectory reconstruction step 240 are described in greater detail hereinafter with reference to FIG. 3.

From step 240, processing continues at step 245. In decision step 245, the process checks if a confidence measure is higher than a predefined threshold. That is, the confidence of reconstruction accuracy of the reconstructed unobserved 3D trajectory is checked to determine if the confidence is higher than a predefined threshold. For the example of FIG. 2, in one embodiment, the confidence is measured as the ratio of the total length of the two reconstructed observed 3D trajectories to the Euclidian distance between the exit point in the first observed 3D trajectory and the entry point in the second observed 3D trajectory. If the confidence measure is greater than a predefined threshold, for example 10 (that is, the total length of the two reconstructed observed 3D trajectories is more than 10 times longer than the Euclidian distance between the exit point in the first observed 3D trajectory and the entry point in the second observed 3D trajectory), step 245 returns true (Yes), and processing moves on to a step 255 for bundle adjustment. The bundle adjustment technique is known to those skilled in the relevant art. Step 255 is described in greater detail hereinafter. However, if the confidence measure is not higher than the pie-defined threshold, step 245 returns false (No), and processing moves on to the unobserved trajectory determination (extrapolation) step 250. Step 250 re-estimates the unobserved 3D trajectory between the two observed 3D trajectories. In one embodiment, the unobserved 3D trajectory may be obtained by polynomial extrapolation. In another embodiment, the unobserved 3D trajectory may be obtained by spline extrapolation. In case of FIG. 1C, the final observed 3D trajectory is obtained based on the two observed 3D trajectories. From step 250, processing continues at step 255.

The bundle adjustment step 255 is optional (indicated by dashed line box) in the method 200 of FIG. 2. Bundle adjustment, which is known to those skilled in the relevant art, is used to simultaneously refine the 3D coordinates of the trajectory and the parameters of the cameras. In step 255, bundle adjustment minimises the re-projection error between the captured locations and the predicted image points, which can be achieved using nonlinear least-squares algorithms. In one implementation, a Levenberg-Marquardt algorithm is used due to the ease of implementation and the effective damping strategy that lends the ability to converge quickly from a wide range of initial guesses to the algorithm. The whole reconstructed 3D trajectory from step 255, including the observed 3D trajectories and the or any unobserved 3D trajectory (or the final observed trajectory), passes to the next step 260. The method 200 terminates in step 260.

5. Example for 3D Trajectory Reconstruction Step

Figure 3A:
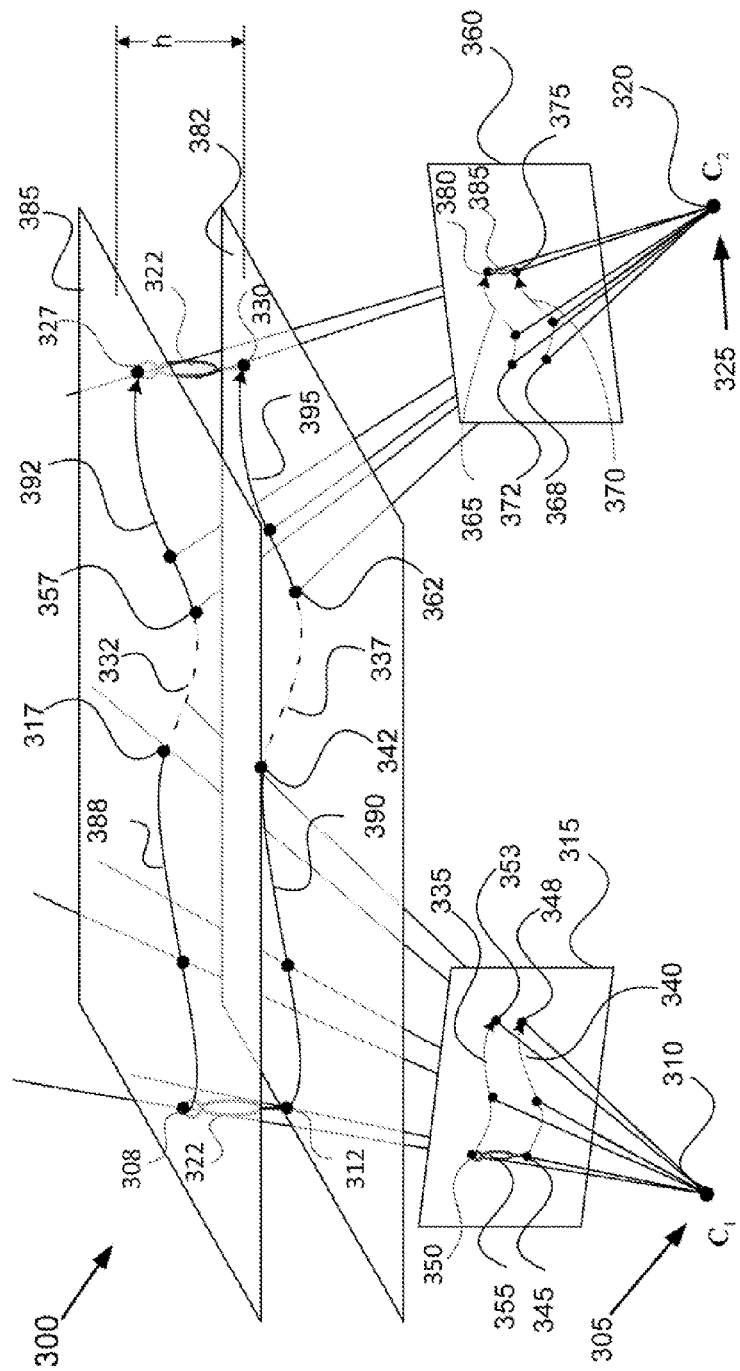

FIG. 3A illustrates an example scenario 300 for the 3D trajectory step 240 of FIG. 2B. A person 322 is walking on a ground plane 382 with an upright posture.

FIG. 3B illustrates in more detail an example of point pair selection for step 205 of FIG. 2B. For the person 322, the point pair is selected, comprising the top point of the person's head 377 and the bottom point of the person's feet 397.

Referring back to FIG. 3A, the selected two points 377 and 397 have a reasonable spatial consistency over time, and therefore the two points move on two parallel planes 385 and 382.

Two cameras, camera 1 305 and camera 2 325 (indicated generally with arrows in FIG. 3A), monitor the scene. The two cameras are calibrated in step 235 of FIG. 2A, giving:
1) The intrinsic parameters of the two cameras 305, 325, such as the focal lengths;
2) The position of camera 1, that is the position of the camera centre $C_1$ 310;
3) The orientation of camera that is the orientation of the image plane 315;
4) The position of camera 2, that is the position of the camera centre $C_2$ 320;
5) The orientation of camera 2, that is the orientation of the image plane 360.

The first camera 305 captures the person 322 in each frame and provides the person's image 355 in the image plane 315. The images 350 and 345 in the image plane 315 of the two selected points are detected in step 210 of FIG. 2A. The two selected points 350 and 345 are tracked across the frames in step 215, giving the observed 2D trajectory 335 for the selected first point 377 of FIG. 3B and the observed 2D trajectory 340 for the selected second point 397 of FIG. 3B. The captured 2D trajectory 335 starts from the image of the selected first point 350 when the person 322 enters the FOV of the first camera 305 with the selected first point 377 of FIG. 3B being at 3D point 308 and ends at the image of the selected first point 353 when the person 322 leaves the FOV of the first camera 305 with the selected first point 377 of FIG. 3B being at 3D point 317. The captured 2D trajectory 340 starts from the image of the selected second point 345 when the person 322 enters the FOV of the first camera 305 with the selected second point 397 of FIG. 3B being at 3D point 312 and ends at the image of the selected second point 348 when the person 322 leaves the FOV of the camera 305 with the selected second point 397 of FIG. 3B being at 3D point 342.

Camera 2 325 captures the person 322 in each frame and provides the person's image 385. The images 372 and 368 of the two selected points are detected in step 220 and tracked across the frames in step 225, giving the observed 2D trajectory 355 for the selected first point 377 of FIG. 3B and the 2D trajectory 370 for the selected second point 397 of FIG. 3B. The captured 2D trajectory 365 starts from the image 372 of the selected first point when the person 322 enters the FOV of the second camera 325 with the selected first point 377 of FIG. 3B being at 3D point 357 and ends at the image 380 of the selected first point when the person 322 leaves the FOV of camera 325 with the selected first point 377 of FIG. 3B being at 3D point 327. The captured 2D trajectory 370 starts from the image 368 of the selected second point when the person 322 enter the FOV of camera 325 with the selected second point 397 of FIG. 3B being at 3D point 362 and ends at the image 375 of the selected second point when the person 322 leaves the FONT of camera 325 with the selected second point 397 of FIG. 3B being at 3D point 330.

From the geometry of projection, the 3D point lies on the back reprojection ray, which emanates from the camera centre and connects the camera centre and the image of the 3D point. For example, the 3D selected first point 308 lies on the back reprojection ray, which projects from the camera centre 310 and connects the camera centre 310 and the image of the selected first point 350 in camera 305.

Let the 3D trajectory of the selected first point comprise the sequence of points $X_1^1, \ldots, X_{N_1}^1, X_{N_1+1}^1, \ldots, X_{N_1+\tau}^1, X_{N_1+\tau+1}^1, \ldots, X_N^1$ a world coordinate system defined in the camera calibration step 235 of FIG. 2A. In the camera calibration step 235, the camera pose for each camera is determined in the same world coordinate system. Each point is the 3D position of the selected first point at a certain time step t=1, 2, . . . , N. The first $N_1$ points $(X_1^1, \ldots, X_{N_1}^1)$ 388 correspond the first $N_1$ time steps and are observed by the camera 305 of FIG. 3A, giving the images 335 of the points $x_{1_t}^1$, t=1, 2, . . . , $N_1$ captured in $N_1$ sequential frames by camera 305. From time step $N_1+1$ to $N_1+\tau$, the $\tau$ points $(X_{N_1+1}^1, \ldots, X_{N_{1+\tau}}^1)$ 332 are left unobserved by either camera 305 or 325. After the gap, the trajectory $(X_{N_1+\tau+1}, \ldots, X_N^1)$ 392 is observed by camera 325, giving the images $x_{2_t}^1$, t=$N_1+\tau+1$, $N_1+\tau+2$, . . . , N 365 captured in ($N-N_1-\tau$) sequential frames by camera 325. Similarly, the 3D trajectory of the selected second point is denoted as $X_t^2$=1, 2, . . . , N. Camera 305 captures the image of the first $N_1$ 3D points 390, denoted as $x_{1_t}^1$, t=1, 2, . . . , $N_1$ 365. Camera 325 captures the image of the last ($N-N_1-\tau$) 3D points 395, denoted as $x_{2_t}^2$, t=$N_1+\tau+1$, $N_1+\tau+2$, N 370. The $\tau$ 3D points 337 are not observed by either camera.

In one embodiment, the person is walking on a ground plane, and therefore the selected second 2D point 397 of FIG. 3B is approximated in 3D as always staying on the ground plane 382, that is, $$X_t^1 = \begin{bmatrix} X_t \\ Y_t \\ 0 \end{bmatrix} \quad (1)$$

where $X_t$ and $Y_t$ are the X and Y coordinates of the selected second point at time step t. The Z coordinate is always 0 in the exemplary arrangement since the selected second point always lies on the plane Z=0 382.

With the assumption that the two selected 2D points have a reasonable spatial consistency over time, the selected first 2D point is represented in 3D as $$X_t^2 = \begin{bmatrix} X_t \\ Y_t \\ h \end{bmatrix} \quad (2)$$

where $X_t$ and $Y_t$ are the X and Y reconstructed coordinates of the selected first 2D point at time step t. That is, the selected first point shares the same motion with the selected second point on the parallel planes 385 and 382. The Z coordinate is always h in the exemplary arrangement since the selected first point always lies on the plane Z=h 385, where h is the distance between the selected first point and the selected second point, and h is also the distance between the two parallel planes 385 and 382.

The projection from the selected first 3D points $X_t^1$ to their images $x_{i_t}^1$ is represented as:

$$\lambda_{it}^1 \begin{bmatrix} x_{it}^1 \\ 1 \end{bmatrix} = P_i \begin{bmatrix} X_t^1 \\ 1 \end{bmatrix} \quad (3)$$

where $\lambda_{it}^1$ is the projective depth, which is known to those skilled in the relevant art, and $P_i$ is the 3×4 projection matrix of camera 305, which is obtained from the calibration step 235 as:

$$P_i = K_i R_i [I | -C_i] \quad (4)$$

where $K_i$ is the calibration matrix comprising the intrinsic parameters of the camera. $R_i$ is the orientation of the camera, and $C_i$ is the position of the camera centre. i=1, 2 to indicate cameras 1 and 2 (305, 325).

To remove the unknown projective depth $\lambda_{it}^1$, Equation (1) is plugged into Equation (3) and the cross product of the two sides is taken so that the following equation is obtained:

$$\begin{bmatrix} x_{it}^1 \\ 1 \end{bmatrix}_x P_{i,1:2} X_{t,1:2}^1 = - \begin{bmatrix} x_{it}^1 \\ 1 \end{bmatrix}_x P_{i,4} \quad (5)$$

where $[\cdot]_x$ is the skew symmetric representation of the cross product $P_{i,1:2}$ is the matrix made of the first two columns from $P_i$. $P_{i,4}$ is the matrix made of the fourth column from $$P_i \cdot X_{t,1:2}^1 = \begin{bmatrix} X_t \\ Y_t \end{bmatrix}$$

is the vector made of the first two entries from $X_t^1$

Similarly, the projection from the selected first 3D points $X_t^2$ to their images $x_{it}^2$ is represented as $$\lambda_{it}^2 \begin{bmatrix} x_{it}^2 \\ 1 \end{bmatrix} = P_i \begin{bmatrix} X_t^2 \\ 1 \end{bmatrix} \quad (6)$$

To remove the unknown projective depth $\lambda_{it}^2$, similar to Equation (5), Equation (2) is plugged into Equation (4):

$$\begin{bmatrix} x_{it}^2 \\ 1 \end{bmatrix}_x P_{i,1:3} \begin{bmatrix} x_{t,1:2}^2 \\ h \end{bmatrix} = - \begin{bmatrix} x_{it}^2 \\ 1 \end{bmatrix}_x P_{i,4} \quad (7)$$

$P_i$ is obtained from the calibration step 235 of FIG. 2A. $x_{it}^1$ and $x_{it}^2$ are detected in the point pair detection steps 210 and 220, and tracked in the 2D images in the point pair tracking steps 215 and 225 of FIG. 2A. The unknowns to be estimated are the motion $$X_{t,1:2}^{21} = X_{t,1:2}^2 = \begin{bmatrix} X_t \\ Y_t \end{bmatrix}$$

of the object on the parallel planes 385 and 382 and the distance h between the two parallel planes.

In one embodiment, stacking the Equations (5) and (7) from the image sequences taken by cameras 1 and 2 (305, 325) gives an over-determined linear system. The unknowns are solved by standard least-squares technique, which is a standard approach to the approximate solution of over-determined system and is known to those skilled in the relevant art. In this embodiment, the solution provides the reconstructed observed 3D trajectories 388, 392 for the selected first point and 390, 395 for the selected second point. The unobserved 3D trajectories 332 and 337 are estimated in the unobserved trajectory extrapolation step 250 of FIG. 2B.

6. Solving Observed and Unobserved 3D Trajectories

FIGS. 4A and 4B illustrate another embodiment for solving for the observed 3D trajectory and the unobserved 3D trajectory based on the linear system.

In FIG. 4A, a general curve 405 is represented as a linear combination of a set of K (for example K=100) bases 410, 415 and 420, for example, using DCT basis functions. $a_1$ 425, $a_2$ 430 and $a_K$ 433 are the coefficients corresponding to the bases 410, 415 and 420. The bases 410, 415 and 420 are called trajectory bases in this embodiment. The space spanned by the trajectory bases is called the trajectory space.

FIG. 4B shows an example of mapping two general trajectories from Euclidean space 435 to the trajectory space 450. The two trajectories 440 and 445 in the Euclidean space 435 are mapped to the K-dimensional trajectory space 450 into two points 455 and 460.

Figure 5:
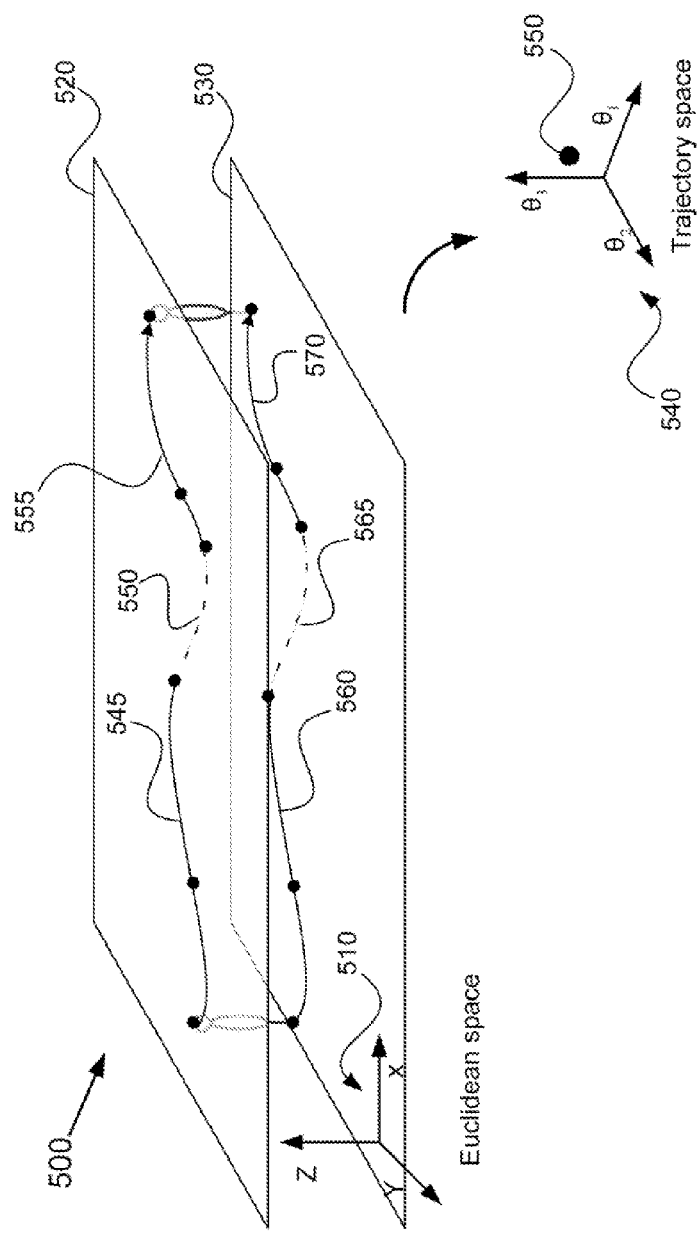
FIG. 5 is a plot showing the 3D trajectory representation using trajectory bases in accordance with the present disclosure.

FIG. 5 illustrates an example of mapping two trajectories from Euclidean space 510 to the trajectory space 540. The two trajectories lie on two parallel planes 520 and 530 and share the same motion along the parallel planes. The parallel planes 520 and 530 are parallel to the plane z=0. The trajectory space 540 is spanned by the trajectory bases considering the x and y components of the trajectories. The first trajectory is the trajectory of the selected, first point, comprising two observed trajectories 545 and 555, and one unobserved trajectory 550. The second trajectory is the trajectory of the selected second point, comprising two observed trajectories 560 and 570, and one unobserved trajectory 565. The two trajectories (545, 550, 555) and (560, 565, 570) are mapped to the same point 550 in the trajectory space 540, since the two trajectories share the same x and y components.

Let the x component of the whole trajectory comprising the observed trajectory and the unobserved trajectory be denoted as:

$$X=[X_1,X_2,\ldots,X_N]^T \quad (8)$$

Let the y component of the whole trajectory comprising the observed trajectory and the unobserved trajectory be denoted as:

$$Y=[Y_1,Y_2,\ldots,Y_N]^T \quad (9)$$

X and Y are represented as the linear combination of a set of K bases, as:

$$X=a_1^x\theta_1+a_2^x\theta_2+\ldots+a_K^x\theta_K \quad (10)$$

$$X=a_1^y\theta_1+a_2^y\theta_2+\ldots+a_K^y\theta_K \quad (11)$$

where $\theta_1, \theta_2, \ldots, \theta_K$ are the K bases. $a_1^x, a_2^x, \ldots, a_K^x$ are the K coefficients to represent the x component of the whole trajectory, $a_1^y, a_2^y, \ldots, a_K^y$ are the K coefficients to represent the y component of the whole trajectory.

Stacking the Equations (5) and (7) from the image sequences taken by camera 1 and camera 2 gives an over-determined linear system. Since the trajectory bases can be pre-determined by a generic set of bases such as the DCT bases, plugging Equations (10) and (11) into the linear system, the unknowns $$X_{t,1:2}^{21}=X_{t,1:2}^2=\begin{bmatrix}X_t\\Y_t\end{bmatrix}$$

is substituted by $a_1^x, a_2^x, \ldots, a_K^x$ and $a_1^y, a_2^y, \ldots, a_K^y$. The unknowns $a_1^x, a_2^x, \ldots, a_K^x$ $a_1^y, a_2^y, \ldots, a_K^y$, and h in the new over-determined linear system are solved by standard least-squares techniques. The whole 3D trajectory including the observed trajectories and the unobserved trajectory is obtained from Equation (10) and (11).

6. Computer Implementation

Figure 8A:
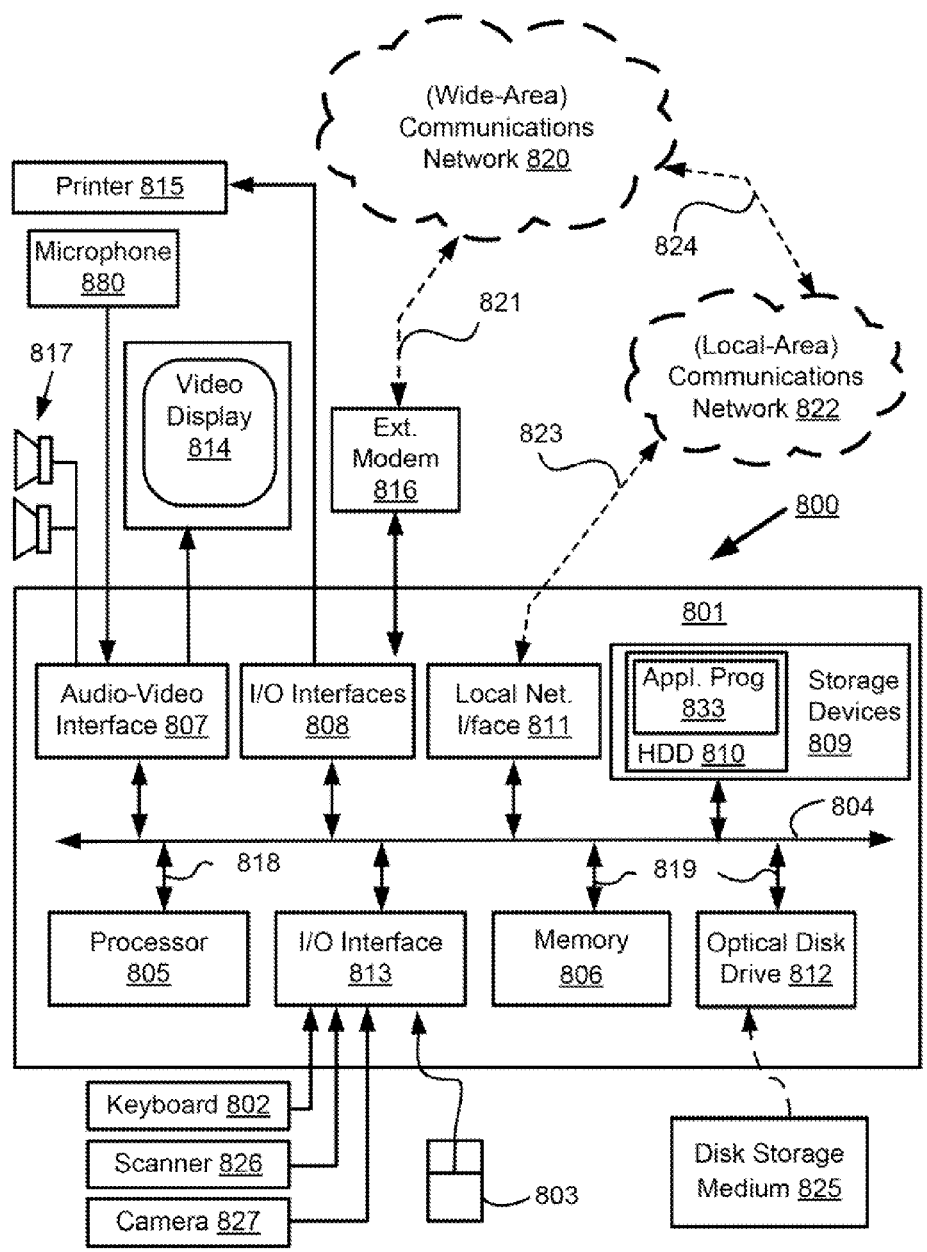
FIGS. 8A and 8B are block diagrams depicting a general-purpose computer system, with which the various arrangements described can be practiced.
Figure 8B:
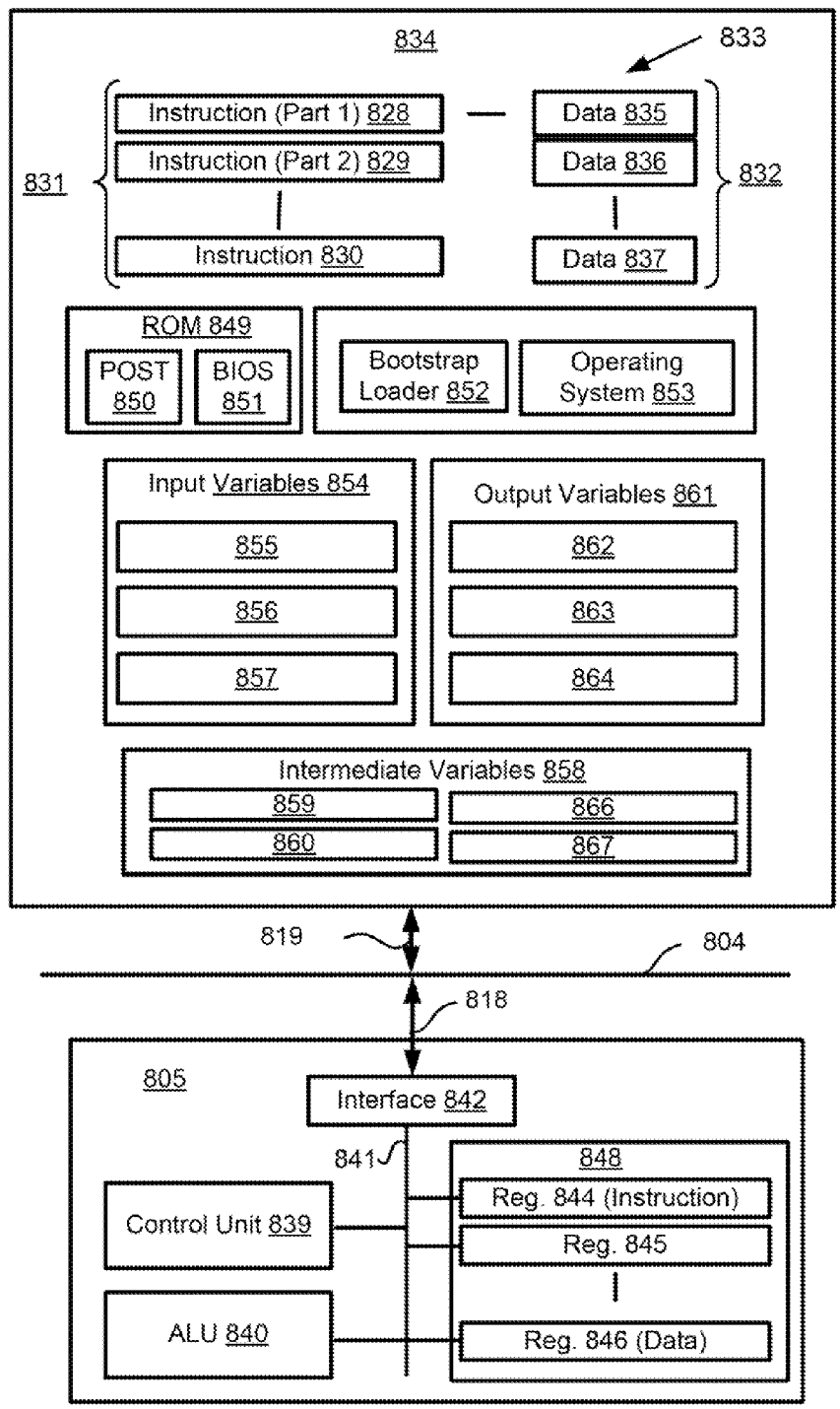

FIGS. 8A and 8B depict a general-purpose computer system 800, upon which the various arrangements described can be practiced.

As seen in FIG. 8A, the computer system 800 includes: a computer module 801; input devices such as a keyboard 802, a mouse pointer device 803, a scanner 826, a camera 627, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least one processor unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet™ circuit card, a Bluetooth™ wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive not illustrated) may also be used. An optical disk drive 812 is typically provided to act as a non-volatile source of data. Portable memory devices, such optical disks (e.g., CD-ROM, DVD, Blu ray Disc™). USB-RAM, portable, external hard drives, and floppy disks, for example, may be used as appropriate sources of data to the system 800.

The components 805 to 813 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparestations, Apple Mac™ or a like computer systems.

The method of determining an unobserved trajectory of an object from at least two observed trajectories of the object in a scene and the method of determining a trajectory of an object from at least two observed partial trajectories in a plurality of non-overlapping images of scenes captured by at least one camera may be implemented using the computer system 800 wherein the processes of FIGS. 1 to 7, as described, may be implemented as one or more software application programs 833 executable within the computer system 800. In particular, the method steps may be effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the method of determining an unobserved trajectory of an object from at least two observed trajectories of the object in a scene and the method of determining a trajectory of an object from at least two observed partial trajectories in a plurality of non-overlapping images of scenes captured by at least one camera and a second part and the corresponding code modules manage a user interface between the first part and the user.

The software may be stored in a computer readable medium, including the storage devices described below, for example. The software is loaded into the computer system 800 from the computer readable medium, and then executed by the computer system 800. A computer readable medium having such software or computer program recorded on the computer readable medium is a computer program product. The use of the computer program product in the computer system 800 preferably effects an advantageous apparatuses for determining an unobserved trajectory of an object from at least two observed trajectories of the object in a scene and apparatuses for determining a trajectory of an object from at least two observed partial trajectories in a plurality of non-overlapping images of scenes captured by at least one camera.

The software 833 is typically stored in the HDD 810 or the memory 806. The software is loaded into the computer system 800 from a computer readable medium, and executed by the computer system 800. Thus, for example, the software 833 may be stored on an optically readable disk storage medium (e.g., CD-ROM) 825 that is read by the optical disk drive 812. A computer readable medium having such software or computer program recorded on A is a computer program product. The use of the computer program product in the computer system 800 preferably effects an apparatus for determining an unobserved trajectory of an object from at least two observed trajectories of the object in a scene and an apparatus for determining a trajectory of an object from at least two observed, partial trajectories in a plurality of non-overlapping images of scenes captured by at least one camera.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media, Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic, user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 1105 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed arrangements use input variables 854, which are stored in the memory 834 in corresponding memory locations 855, 856, 857. The arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

(a) a fetch operation, which fetches or reads an instruction 831 from a memory location 828, 829, 830;

(b) a decode operation in which the control unit 839 determines which instruction has been fetched; and (c) an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 1 to 7 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The method of determining an unobserved trajectory of an object from at least two observed trajectories of the object in a scene and the method of determining a trajectory of an object from at least two observed partial trajectories in a plurality of non-overlapping images of scenes captured by at least one camera may each alternatively be implemented in dedicated hardware such as one or more integrated circuits performing, functions or sub functions. Such dedicated hardware may include graphic processors, digital signal processors, or one or more microprocessors and associated memories.

INDUSTRIAL APPLICABILITY

The arrangements described are applicable to the computer and data processing industries and particularly for digital image processing for surveillance purposes, image generation, and photo album production.

Methods, apparatuses, and computer program products for determining an unobserved trajectory of an object from at least two observed trajectories of the object in a scene have been described. Also methods, apparatuses, and computer program products for determining a trajectory of an object from at least two observed partial trajectories in a plurality of non-overlapping images of scenes captured by at least one camera have been described. The foregoing describes only some embodiments of the present invention, and modifications and/or changes can be made thereto without departing from the scope and spirit of the invention, the embodiments being illustrative and not restrictive.

I claim:

1. A method of determining a 3D trajectory of an object from at least two observed trajectories of the object in a scene, there being at least one unobserved trajectory of the object between the at least two observed trajectories, said at least two observed trajectories being captured in a series of images by at least one camera, each of the images in the series being associated with one of first and second poses of the at least one camera, said method comprising the steps of:

selecting first and second points on the object from separate parallel planes of the scene for establishing a set of 2D capture locations;

determining, from the series of captured images of the first pose of the at least one camera, a first set of 2D capture locations corresponding to the first point and a second set of 2D capture locations corresponding to the second point;

determining, from the series of captured images of the second pose of the camera, a third set of 2D capture locations corresponding to the first point and a fourth set of 2D capture locations corresponding to the second point;

reconstructing, relative to the first pose of the at least one camera and the second pose of the at least one camera, a first approximated 3D trajectory from the first set of 2D capture locations and the third set of 2D capture locations in the scene based on a spatial consistency of the first set of 2D capture locations and the third set of 2D capture locations and at least one unobserved location corresponding to the first point between the first set of 2D capture locations and the third set of 2D capture locations;

reconstructing, relative to the first pose of the at least one camera and the second pose of the at least one camera, a second approximated 3D trajectory from the second set of 2D capture locations and the fourth set of 2D capture locations in the scene based on a spatial consistency of the second set of 2D capture locations and the fourth set of 2D capture locations and at least one unobserved location corresponding to the second point between the second set of 2D capture locations and the fourth set of 2D capture locations; and determining the 3D trajectory of the object based on the first and second approximated 3D trajectories, the determined 3D trajectory representing 3D locational information of the object when moving along the at least two observed trajectories and the at least one unobserved trajectory.

2. The method as claimed in claim 1, wherein said first and second approximated 3D trajectories have a shared combination of trajectory bases.

3. The method as claimed in claim 1, further comprising the steps of:
computing a confidence measure for the determined 3D trajectory of the object; and
upon determining the confidence measure is below a predefined value, extrapolating between the reconstructed at least two approximated 3D trajectories to determine the 3D trajectory of the object.

4. The method as claimed in claim 1, wherein the first pose is the second pose of a single camera and the series of images is associated with the same pose of the single camera.

5. The method as claimed in claim 1, wherein the separate parallel planes are horizontal.

6. An apparatus for determining a 3D trajectory of an object from at least two observed trajectories of the object in a scene, there being at least one unobserved trajectory of the object between the at least two observed trajectories, said at least two observed trajectories being captured in a series of images by at least one camera, each of the images in the series being associated with one of first and second poses of the at least one camera, said apparatus comprising:
an interface for receiving data from the at least one camera;
a memory for storing data and computer program code;
a processor coupled to said interface and said memory for executing a computer program for determining said 3D trajectory of the object from the at least two observed trajectories of the object in a scene, said computer program comprising:
computer program code for selecting first and second points on the object from separate parallel planes of the scene for establishing a set of 2D capture locations;
computer program code for determining, from the series of captured images of the first pose of the at least one camera, a first set of 2D capture locations corresponding to the first point and a second set of 2D capture locations corresponding to the second point;
computer program code for determining, from the series of captured images of the second pose of the at least one camera, a third set of 2D capture locations corresponding to the first point and a fourth set of 2D capture locations corresponding to the second point;
computer program code for reconstructing, relative to the first pose of the at least one camera, a first approximated 3D trajectory from the first set of 2D capture locations and the third set of 2D capture locations in the scene based on a spatial consistency of the first set of 2D capture locations and the third set of 2D capture locations and at least one unobserved location corresponding to the first point between the first set of 2D capture locations and the third set of 2D capture locations; reconstructing, relative to the second pose of the at least one camera, a second approximated 3D trajectory from the second set of 2D capture locations and the fourth set of 2D capture locations in the scene based on a spatial consistency of the second set of 2D capture locations and the fourth set of 2D capture locations and at least one unobserved location corresponding to the second point between the second set of 2D capture locations and the fourth set of 2D capture locations; and
computer program code for determining the 3D trajectory of the object based on the first and second approximated 3D trajectories, the determined 3D trajectory representing 3D locational information of the object when moving along the at least two observed trajectories and the at least one unobserved trajectory.

7. The apparatus as claimed in claim 6, comprising a camera.

8. The apparatus as claimed in claim 6, wherein said first and second 3D approximated trajectories have a shared combination of trajectory bases.

9. The apparatus as claimed in claim 6, further comprising:
computer program code module for computing a confidence measure for the 3D trajectory from the determined 3D trajectory of the object; and
computer program code module for upon determining the confidence measure is below a predefined value, extrapolating between the reconstructed at least two approximated 3D trajectories to determine the 3D trajectory of the object.

10. The apparatus as claimed in claim 6, wherein the first pose is the second pose of a single camera and the series of images are associated with the same pose of the single camera.

11. The apparatus as claimed in claim 6, wherein the separate parallel planes are horizontal.

12. The apparatus as claimed in claim 6, wherein the apparatus is a camera.

* * * * *